US012570278B1

(12) United States Patent
    Kiiski et al.

(10) Patent No.: US 12,570,278 B1
(45) Date of Patent: Mar. 10, 2026

(54) SYSTEM FOR EVALUATING A LANE CHANGE OPERATION OF AN AUTONOMOUS VEHICLE

(71) Applicant: Zoox, Inc., Foster City, CA (US)

(72) Inventors: Joona Markus Petteri Kiiski, Cupertino, CA (US); Marc Wimmershoff, Redwood City, CA (US); Rick Zhang, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 343 days.

(21) Appl. No.: 18/222,686

(22) Filed: Jul. 17, 2023

(51) Int. Cl.
    B60W 30/09 (2012.01)
(52) U.S. Cl.
    CPC ....... B60W 30/09 (2013.01); B60W 2554/801 (2020.02); B60W 2554/802 (2020.02)

(58) Field of Classification Search
    CPC ........... B60W 30/09; B60W 2554/801; B60W 2554/802
    See application file for complete search history.

(56) References Cited

U.S. PATENT DOCUMENTS

| | | | |
|---|---|---|---|
| 2017/0291602 A1* | 10/2017 | Newman | B60W 50/16 |
| 2022/0073076 A1* | 3/2022 | Du | B62D 15/0255 |
| 2024/0059285 A1* | 2/2024 | Ng | B60W 50/14 |

* cited by examiner

*Primary Examiner* — Russell Frejd
*Assistant Examiner* — Ana D Thomas
(74) *Attorney, Agent, or Firm* — Lee & Hayes, P.C.

(57) ABSTRACT

Techniques for improving operational decisions of an autonomous vehicle are discussed herein. In some cases, a system may generate a lane change score based on one or more lateral metrics and one or more longitudinal metrics associated with the lane change trajectory. The system may then determine if the lane change operation is safe based on the lane change score.

20 Claims, 9 Drawing Sheets

200

300

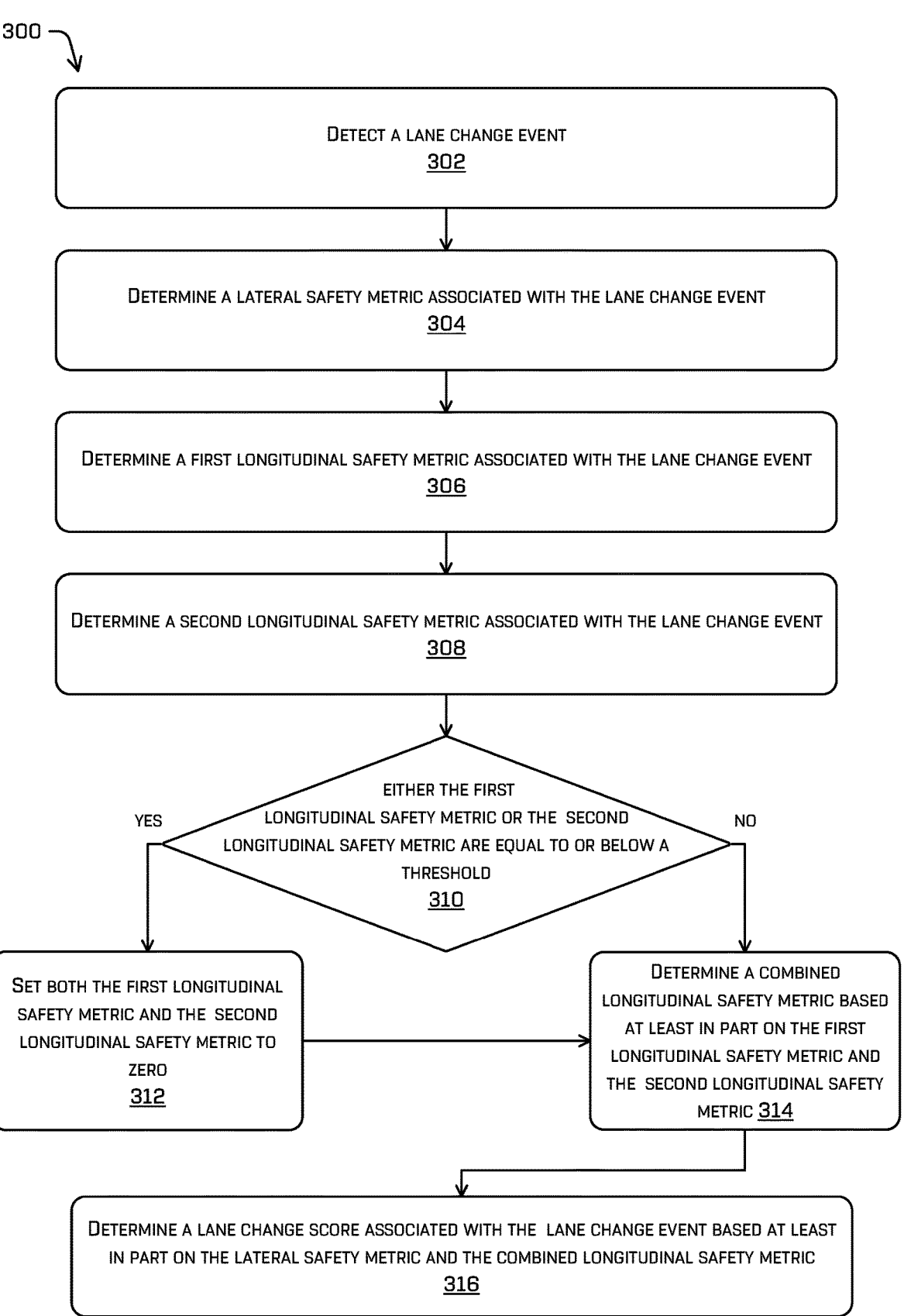

DETECT A LANE CHANGE EVENT
302

DETERMINE A LATERAL SAFETY METRIC ASSOCIATED WITH THE LANE CHANGE EVENT
304

DETERMINE A FIRST LONGITUDINAL SAFETY METRIC ASSOCIATED WITH THE LANE CHANGE EVENT
306

DETERMINE A SECOND LONGITUDINAL SAFETY METRIC ASSOCIATED WITH THE LANE CHANGE EVENT
308

EITHER THE FIRST LONGITUDINAL SAFETY METRIC OR THE SECOND LONGITUDINAL SAFETY METRIC ARE EQUAL TO OR BELOW A THRESHOLD
310

YES

NO

SET BOTH THE FIRST LONGITUDINAL SAFETY METRIC AND THE SECOND LONGITUDINAL SAFETY METRIC TO ZERO
312

DETERMINE A COMBINED LONGITUDINAL SAFETY METRIC BASED AT LEAST IN PART ON THE FIRST LONGITUDINAL SAFETY METRIC AND THE SECOND LONGITUDINAL SAFETY METRIC 314

DETERMINE A LANE CHANGE SCORE ASSOCIATED WITH THE LANE CHANGE EVENT BASED AT LEAST IN PART ON THE LATERAL SAFETY METRIC AND THE COMBINED LONGITUDINAL SAFETY METRIC
316

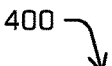

DETERMINE A LATERAL COMPONENT ASSOCIATED WITH A LANE CHANGE TRAJECTORY
402

DETERMINE A LATERAL DISTANCE BETWEEN AN OBJECT AND A VEHICLE EXECUTING THE LANE CHANGE TRAJECTORY
404

DETERMINE A PERIOD OF TIME BASED AT LEAST IN PART ON THE LATERAL COMPONENT AND THE LATERAL DISTANCE
406

DETERMINE A LATERAL SAFETY METRIC LANE BASED AT LEAST IN PART ON THE PERIOD OF TIME AND ONE OR MORE THRESHOLDS
408

DETERMINE A LANE CHANGE SCORE BASED AT LEAST IN PART ON THE LATERAL SAFETY METRIC AND AT LEAST ONE LONGITUDINAL SAFETY METRIC
410

FIG. 4

500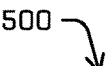

DETERMINE A LONGITUDINAL COMPONENT ASSOCIATED WITH A LANE CHANGE TRAJECTORY
502

DETERMINE A LONGITUDINAL DISTANCE BETWEEN AN OBJECT AND A VEHICLE EXECUTING THE LANE CHANGE TRAJECTORY
504

DETERMINE A RELATIVE VELOCITY BETWEEN THE OBJECT AND THE VEHICLE
506

DETERMINE A PERIOD OF TIME BASED AT LEAST IN PART ON THE LONGITUDINAL COMPONENT, THE LONGITUDINAL DISTANCE, AND THE RELATIVE VELOCITY
508

DETERMINE A FIRST LONGITUDINAL SAFETY METRIC LANE BASED AT LEAST IN PART ON THE PERIOD OF TIME AND ONE OR MORE THRESHOLDS
510

DETERMINE A LANE CHANGE SCORE BASED AT LEAST IN PART ON THE FIRST LONGITUDINAL SAFETY METRIC AND AT LEAST ONE OTHER SAFETY METRIC
512

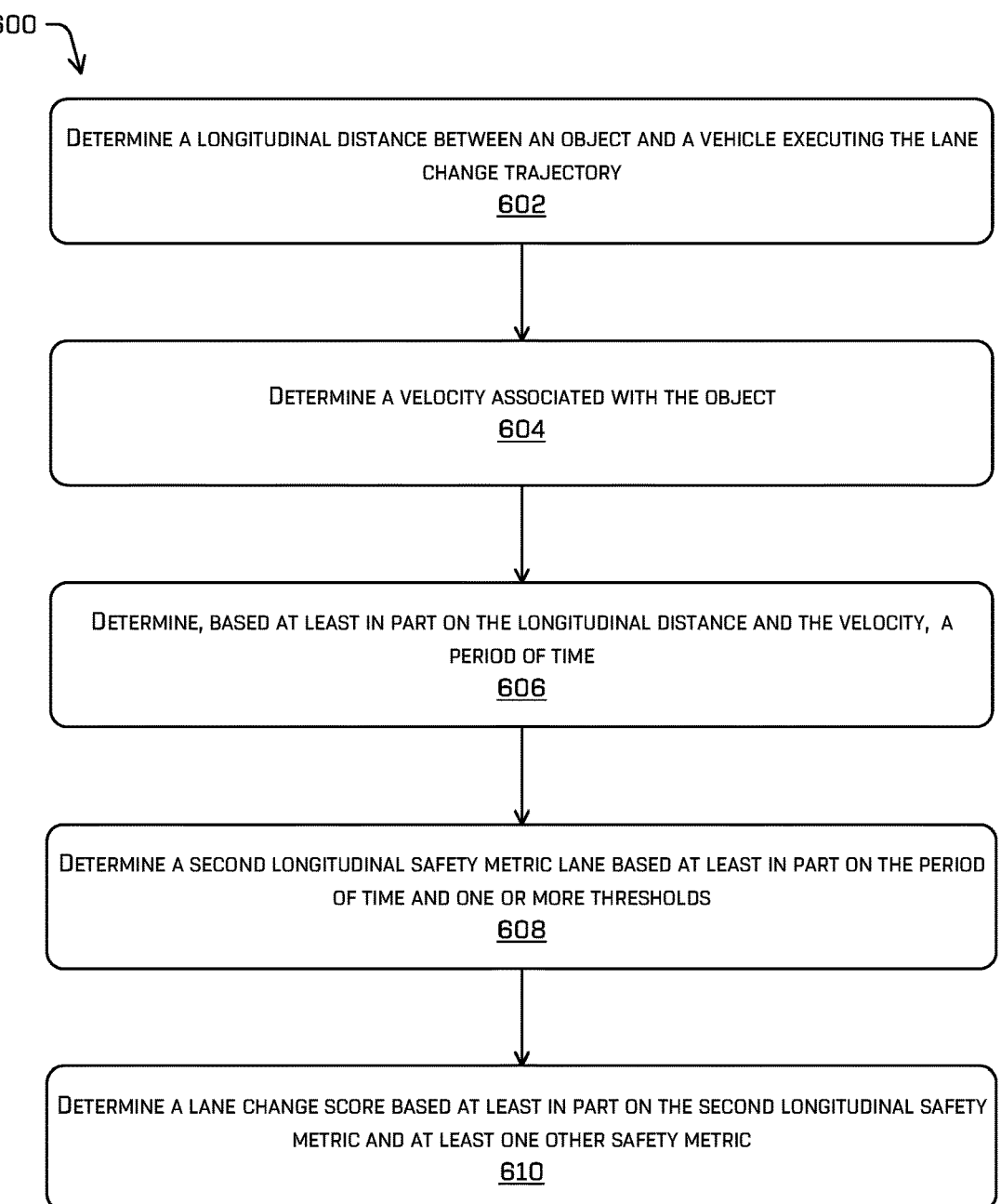

DETERMINE A LONGITUDINAL DISTANCE BETWEEN AN OBJECT AND A VEHICLE EXECUTING THE LANE CHANGE TRAJECTORY
602

DETERMINE A VELOCITY ASSOCIATED WITH THE OBJECT
604

DETERMINE, BASED AT LEAST IN PART ON THE LONGITUDINAL DISTANCE AND THE VELOCITY, A PERIOD OF TIME
606

DETERMINE A SECOND LONGITUDINAL SAFETY METRIC LANE BASED AT LEAST IN PART ON THE PERIOD OF TIME AND ONE OR MORE THRESHOLDS
608

DETERMINE A LANE CHANGE SCORE BASED AT LEAST IN PART ON THE SECOND LONGITUDINAL SAFETY METRIC AND AT LEAST ONE OTHER SAFETY METRIC
610

FIG. 6

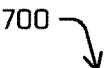

700

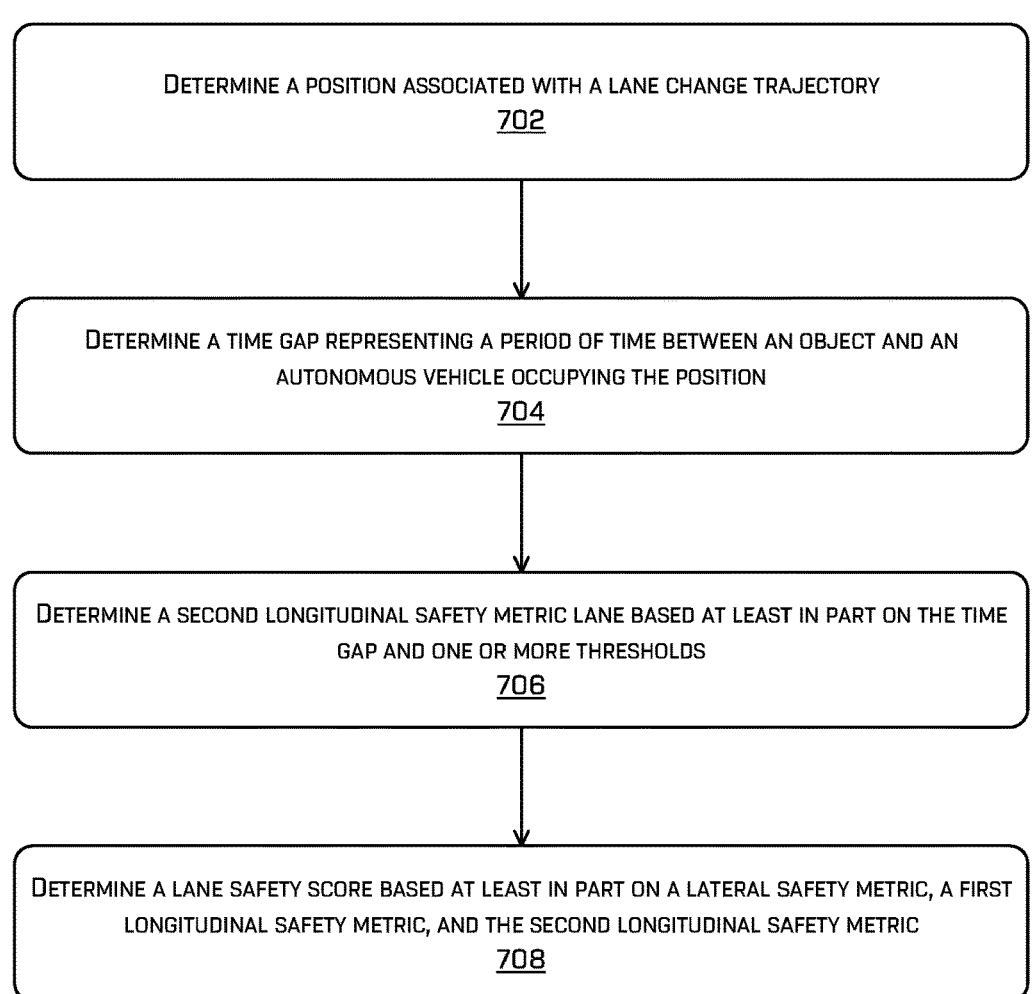

DETERMINE A POSITION ASSOCIATED WITH A LANE CHANGE TRAJECTORY
702

DETERMINE A TIME GAP REPRESENTING A PERIOD OF TIME BETWEEN AN OBJECT AND AN
AUTONOMOUS VEHICLE OCCUPYING THE POSITION
704

DETERMINE A SECOND LONGITUDINAL SAFETY METRIC LANE BASED AT LEAST IN PART ON THE TIME
GAP AND ONE OR MORE THRESHOLDS
706

DETERMINE A LANE SAFETY SCORE BASED AT LEAST IN PART ON A LATERAL SAFETY METRIC, A FIRST
LONGITUDINAL SAFETY METRIC, AND THE SECOND LONGITUDINAL SAFETY METRIC
708

FIG. 7

SYSTEM FOR EVALUATING A LANE CHANGE OPERATION OF AN AUTONOMOUS VEHICLE

BACKGROUND

Autonomous vehicles may navigate along routes. For example, when the autonomous vehicles receive requests to travel to destination locations, the autonomous vehicles may navigate along routes from the current locations of the autonomous vehicles to a pickup location to pick up a passenger and/or from the pickup location to the destination locations. While navigating, the autonomous vehicles may make operational decisions based on a scene context generated from sensor data representative of the physical environment. In some cases, the autonomous vehicle may perform lane changes to improve the overall operational performance or reduce drive time of the vehicle while traversing from the pickup location to the destination.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 is a flow diagram illustrating an example process associated with determining a lane change score associated with a lane change trajectory, in accordance with implementations of the disclosure.

FIG. 4 is a flow diagram illustrating an example process associated with determining a lateral safety metric associated with a lane change score, in accordance with implementations of the disclosure.

FIG. 5 is a flow diagram illustrating an example process associated with determining a first longitudinal safety metric associated with a lane change score, in accordance with implementations of the disclosure.

FIG. 6 is a flow diagram illustrating an example process associated with determining a second longitudinal safety metric associated with a lane change score, in accordance with implementations of the disclosure.

FIG. 7 is another flow diagram illustrating an example process associated with determining a second longitudinal safety metric associated with a lane change score, in accordance with implementations of the disclosure.

DETAILED DESCRIPTION

Figure 1:
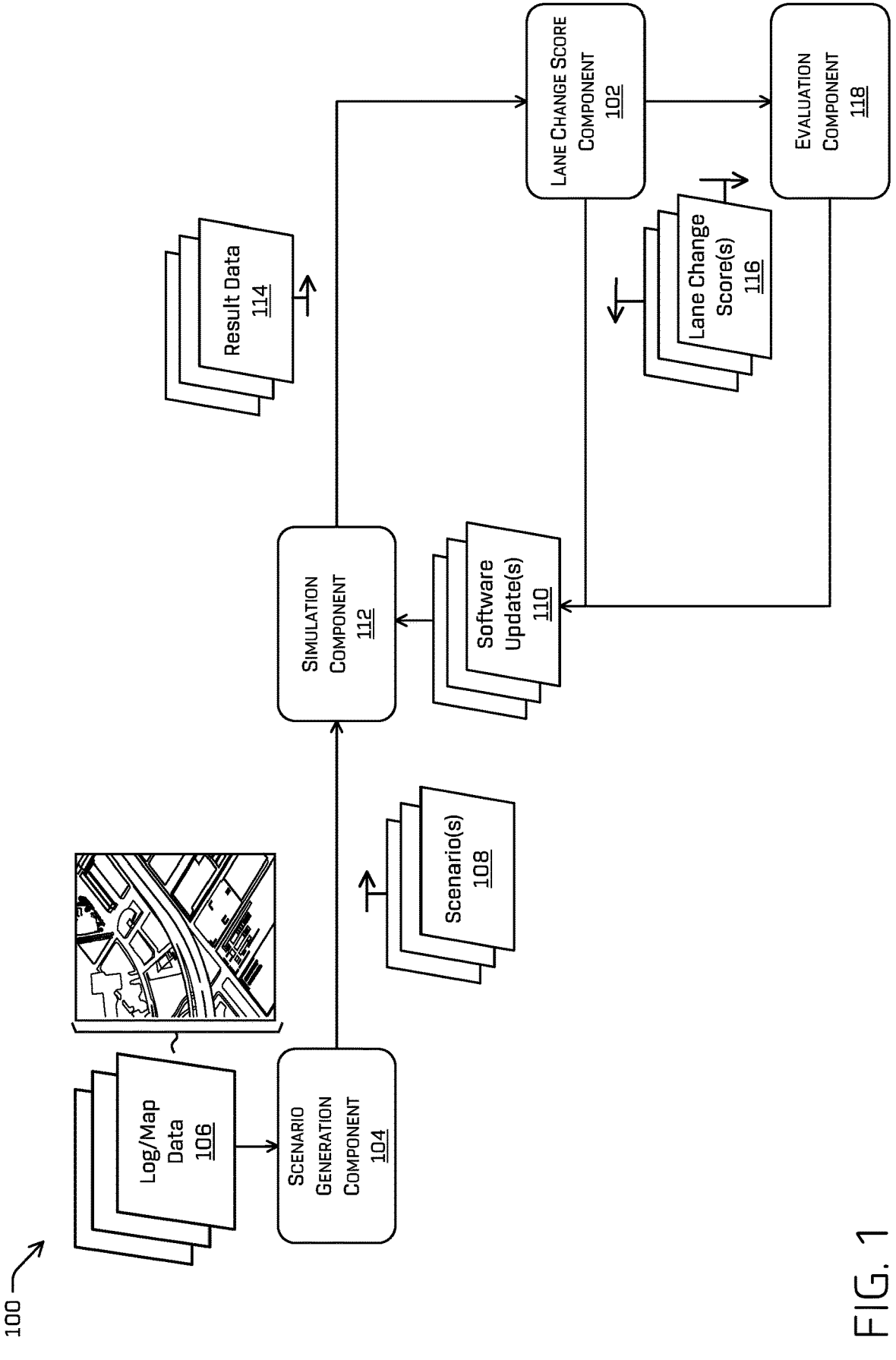
FIG. 1 is an example block-diagram illustrating an example architecture of a simulation system comprising a lane change score component, in accordance with implementations of the disclosure.

As discussed herein, autonomous vehicles may navigate through physical environments. For example, when an autonomous vehicle receives a request to travel to a destination location, the autonomous vehicle may navigate along a reference trajectory or route from the current location of the autonomous vehicle to a pickup location to pick up a passenger and then from the pickup location to the destination location. While navigating, the autonomous vehicle may encounter both dynamic objects (e.g., vehicles, pedestrians, animals, and the like) and static objects (e.g., buildings, signage, parked vehicles, and the like) in the environment. In order to ensure the safety of the occupants and objects and make operational decisions (such as lane change decision, passing decisions, or the like), the system and vehicle, discussed herein, may evaluate the relative positions, spacing, and/or velocities of the vehicle relative to one or more objects in the environment. In some cases, prior to deploying a software update, the vehicle operations associated with the software update may be tested over a large number of simulations having varying scenarios (e.g., conditions, dynamic objects, static objects, or the like). In this manner, the system, discussed herein, may simulate, model, and/or test autonomous vehicles systems and software prior to and/or during operation of the vehicle using the software update to improve overall operations and safety of the autonomous vehicles.

In some situations, providing a software update associated with operational controls of an autonomous vehicle may result in unexpected behaviors, such as spontaneous, abrupt, or unnecessary lane change events. The system, discussed herein, may, during the simulated scenarios, determine a lane change score or metric associated with the simulated operations of the vehicle, as the vehicle travels from the pickup location to the destination. In some cases, the lane change score may be determined based at least in part on characteristics or features of proximate static objects, predicted statuses and/or behaviors of proximate dynamic objects, and the current operational features of the autonomous vehicle. For example, the lane change score may be determined based at least in part on one or more longitudinal metrics or portions and one or more lateral metrics or portions associated with the lane change event, the autonomous vehicle, and/or proximate objects, as discussed below.

As one illustrative example, the lane change score may utilize a lateral safety metric, as well as a first longitudinal safety metric and a second longitudinal safety metric. In some cases, the lateral safety metric may represent a lateral time to contact between the autonomous vehicle and another object (such as a dynamic object in the adjacent lane). For example, the lateral safety metric may be a value between zero and one, where one represents a safe or acceptable score in the lateral direction. In this example, the lateral safety metric may be zero if the time to contact is less than or equal to two seconds and one if the time to contact is greater than or equal to three seconds. The lateral safety metric may be between zero and one if the time to contact in the lateral direction is between two and three seconds. In this example, the lateral direction may be relative to the vehicle, such that a longitudinal direction aligns with the longitudinal axis of the vehicle (e.g., a direction or axis from a front axle or front bumper of the vehicle to a rear axle or rear bumper of the vehicle) and the lateral direction is substantially perpendicular to the longitudinal axis of the vehicle.

The first longitudinal safety metric may represent a longitudinal time to contact (e.g., forward from the front of the vehicle or backwards from the rear of the vehicle) between the autonomous vehicle and another object (such as a dynamic object in the current lane and/or adjacent lane). For example, the first longitudinal safety metric may also be a value between zero and one, where one represents a safe score in the longitudinal direction. In this example, the first longitudinal safety metric may be zero if the time to contact in the longitudinal direction is less than or equal to two seconds and one if the time to contact is greater than or equal to three seconds. The first longitudinal safety metric may be between zero and one if the time to contact in the longitudinal direction is between two and three seconds.

The second longitudinal safety metric may represent a time gap in longitudinal direction of the vehicle. In some cases, the system may utilize a longitudinal distance between the vehicle and a velocity of the trailing object or vehicle to determine a period of time associated with the time gap. For example, the time gap may represent a period of time or time gap between the object and the vehicle occupying a position in the physical environment. In some cases, the position may be selected as a current position of a bumper of the object or vehicle, whichever is ahead. In other words, the time gap may represent a period of time or time gap between the vehicle exiting a position or point of the physical environment until a longitudinal object (e.g., an object following or behind the vehicle) occupies the position or point or a period of time or time gap between a longitudinal object (e.g., an object proceeding, leading, or ahead of the vehicle) exiting a position or point of the physical environment until the vehicle occupies the position or point. The second longitudinal safety metric may also be a value between zero and one, where one represents a safe score in the longitudinal direction. In this example, the first longitudinal safety metric may be zero if the time to contact in the longitudinal direction is less than or equal to 0.8 seconds and one if the time to contact is greater than or equal to two seconds. The second longitudinal safety metric may be between zero and one if the time to contact in the longitudinal direction is between 0.8 and two seconds. In some examples, the time gap of the second longitudinal safety metric may be associated with or represent the time period in which drivers of other nearby vehicles have to perceive and react to the vehicle lane change maneuver.

In the above examples, the lateral safety metric, the first longitudinal safety metric, and/or the second longitudinal safety metric are set to values between zero and one but it should be understood that various other scoring or ranking metrics may be used herein. Likewise, the values associated with various periods of time for the lateral time to contact, the longitudinal time to contact, and the longitudinal time gap may vary. For example, the periods of times to scores may be adjusted for various changing safety factors associated with the vehicle, changed characteristics of the vehicle (such as changes in dimensions or mass for newer models), and the like. In some cases, the periods of times considered safe may also vary based on situational changes, such as type or class of roadway, amount of congestion, class of nearby or proximate automobiles (e.g., a bike v a semi-truck or the like).

In the above examples, the period of times associated with the lateral safety metric, the first longitudinal safety metric, and/or the second longitudinal safety metric may be selected ensure safe or acceptable lane change maneuvers are performed by the autonomous vehicle. In some case, the period of time may be associated with a period of time necessary for a human operator to intercede and manually control of the vehicle through the lane change event and/or to abort the lane change event. In some cases, the periods of time associated with the lateral safety metric, the first longitudinal safety metric, and/or the second longitudinal safety metric may be tuned (either in substantially real-time or prior to traversing a planned path) based on various factors such as safety, performance, size of the vehicle, speed, velocity, amount of traffic, number of lanes, type of roadway, and/or the like.

In some cases, the lane change metric or portion may be associated with a time period in which a safety operator or the vehicle may abort the lane change event. For example, in some cases, the autonomous vehicle may include a manual or human override feature that allows for a remote operator to take control or otherwise drive the vehicle in specific situations to thereby improve the safety of the operations of the vehicle. In this example, the lane change score may include a metric or portion determined based at least in part on a period or length of time that is sufficient for the operator to abort or modify the lane change event or operation once the event or operation has commenced and/or for operators of nearby vehicles to safely react to the lane change event. In some examples, the time gap of the second longitudinal safety metric may be associated with or represent the time period in which the safety operator may abort the lane change.

In examples, determining the lane change score based at least in part on the lateral safety metric, the first longitudinal safety metric, and the second longitudinal safety metric, may include setting both the first longitudinal safety metric and the second longitudinal safety metric to zero if either of the first longitudinal safety metric or the second longitudinal safety metric are zero (e.g., if either score is deemed unacceptable for the lane change operation, the longitudinal direction is deemed unacceptable and both value may be set to zero for calculating the lane change score). The system may then average the first longitudinal safety metric and the second longitudinal safety metric to determine an average longitudinal safety metric. Next, the system may take the maximum of the lateral safety metric and the average longitudinal safety metric as the lane change score.

As another example, rather than determine an average longitudinal safety metric, the system may multiply the first longitudinal safety metric with the second longitudinal safety metric to generate a combined longitudinal safety metric. Next, the system may determine the square root of the combined longitudinal safety metric to generate a final longitudinal safety metric. The system may then again take the maximum of the lateral safety metric and the average longitudinal safety metric as the lane change score.

In still other examples, the first longitudinal safety metric and the second longitudinal safety metric may be combined in other manners. In some cases, the combination technique may vary or be selected based on a combination of factors, such as class or type of road, features of proximate objects or other agents, quantity of proximate objects or agents, features of the vehicle (e.g., velocity, dimensions, mass, estimated time of travel, and the like). In some cases, the system may utilize various transformations in various domains (such as the time domain) to combine the first longitudinal safety metric and the second longitudinal safety metric. In some cases, the combined metric may be ranked or scored such that higher values represent safer lane change operations or events while lower values represent higher risk lane change operations or events, which may be avoided.

In some examples, the system may determine a lane change score for a current time as well a series of times in the future. For instance, the system may determine the lane change score for the current time and an additional one, two, three, or the like future time stamps. In some cases, the individual time stamps may be at an interval associated with vehicle operations or systems (e.g., a planning system), an interval associated with one or more sensors of the vehicle or a perception system of the vehicle, or a predetermined interval (e.g., every half second, every second, every two seconds, or the like). The system may then compare each of the lane change scores to one or more thresholds and/or heuristics to determine if the lane change event is safe.

In some examples, when determining the lateral safety metric, the first longitudinal safety metric, and the second longitudinal safety metric, the system may consider or limit the objects to dynamic objects that may occupy the target lane. For example, this may include dynamic objects currently occupying the target lane, dynamic objects in transition (e.g., also lane changing) to the target lane, or the like. In this manner, the number of objects may be reduced and the overall computational resources and time associated with determining the lane change score may also be reduced, thereby improving safety of the vehicle operations.

In some cases, the lane change score may also include additional metrics. For instance, the system may include a classification metric, that may take into account type or class of nearby objects (e.g., a nearby semi-truck versus a motorcycle), a static object metric for static objects in either the current lane or the target lane, a cross traffic or junction metric for nearby cross streets, intersections, traffic lights, or stop signs, and the like, an object characteristic metric based on determining characteristics or features of the object, and the like. In some cases, the system may generate a modified lane change score based on the lane change score and the additional metrics. As one example, a modified score may be determined using a classification metric associated with a classification of the object. For instance, the classification may be used to infer mass (e.g., a bicycles mass versus a semi-trucks mass) which may be used to infer a safety associated with the lane change operation or event.

In implementations, the system may, during a simulation of the operations of the vehicle, determine a first trajectory associated with a potential lane change event (e.g., a vehicle navigating from a current lane to a target lane). For instance, the system may determine the vehicle is traveling in a current lane and that transiting to a target lane may improve the operations of the vehicle, such as a slow moving object or agent is ahead of the vehicle in the current lane and the vehicle may pass the slow moving object in the target lane. In this instance, the system may determine the first trajectory to move past the slow moving object.

The system may then determine the lateral safety metric associated with the first trajectory and proximate objects, as discussed above. For example, the system may determine a lateral distance between an object (such as an object in the target lane) and the vehicle as well as a relative velocity between the object and the vehicle based at least in part on sensor data (such as simulated sensor data captured by the vehicle) associated with the object. In some cases, the lateral distance may be a distance to the nearest object in the lateral direction of the vehicle to which the vehicle is transiting (e.g., the direction of the target lane with respect to the vehicle). The system may also determine a lateral component associated with the first trajectory (e.g., the lane change trajectory). Next, the system may determine a first period of time (e.g., a time to contact in the lateral direction) based at least in part on the lateral component of the first trajectory, the lateral distance, and/or the relative velocity. As one illustrative example, the system may determine for each interval (such as for each second forward from a current time) along the lateral component of the first trajectory if the object contacts the vehicle. The system may then determine the first period of time based on the number of intervals until the predicted contact. The first period of time may then be compared to one or more first thresholds or heuristics to determine the lateral safety metric associated with the lane change event and/or the first trajectory.

The system may determine a longitudinal component associated with the first trajectory (e.g., the lane change trajectory). The system may also determine a longitudinal distance between an object and the vehicle (e.g., either the object in the target lane, discussed above, or a second object such as a second object or agent ahead or behind the vehicle). In some cases, the longitudinal distance may be a distance to the nearest object in the longitudinal direction. If the object in the lateral direction and the longitudinal direction is the same, the system may determine a second period of time (e.g., a time to contact in the longitudinal direction) based at least in part on the longitudinal component of the first trajectory, the longitudinal distance, and/or the relative velocity. The second period of time may then be compared to one or more second thresholds or heuristics to determine the first longitudinal safety metric associated with the lane change event and/or the first trajectory. If the object is different than the object in the lateral direction, the system may determine a second relative velocity between the vehicle and the second object and utilize the second relative velocity to determine the second period of time.

The system may also determine a time gap or third period of time in the longitudinal direction. For instance, the system may select a position or point in the longitudinal direction with respect to the longitudinal component of the first trajectory. The system may then determine the third period of time representing a predicted amount of time between the vehicle departing or leaving the position and an object occupying the position or, alternatively, the object departing or leaving the position and the vehicle occupying the position (depending on which of the vehicle or object is ahead or in front of the other). The third period of time may then be compared to one or more third thresholds or heuristics to determine the second longitudinal safety metric associated with the lane change event and/or the first trajectory.

The system may then determine a lane change score based on the lateral safety metric, the first longitudinal safety metric, and the second longitudinal safety metric and, ultimately, determine if the lane change event complies with the safety metrics (e.g., provides a human operator and/or drivers of other nearby vehicles with sufficient time to perceive, react, and/or adapt to the lane change event). In some cases, the system may output based at least in part on the lane change score an indication or alert representing whether the first trajectory is safe and if the human operator has sufficient time to safely take control or otherwise control the vehicle if necessary.

In some implementations, the system calculates a single lateral safety metric, first longitudinal safety metric, and second longitudinal safety metric using a nearest object. However, in some implementations, it should be understood that the system may determine multiple lateral safety metrics, first longitudinal safety metrics, and/or second longitudinal safety metrics when multiple objects are within the current lane and/or target lane. For example, the system may calculate a lateral safety metrics, first longitudinal safety metrics, and/or second longitudinal safety metrics as well as a lane change score for each individual object in the target lane, each individual object in the current lane, each individual object predicted to traverse to the target lane, and/or each individual object predicted to traverse to the current lane. In some cases, the system may also calculate a lateral safety metrics, first longitudinal safety metrics, and/or second longitudinal safety metrics as well as a lane change score for objects in a cross street or roadway that may intersect with the lane change trajectory (e.g., an object moving through the target lane and/or current lane).

In some examples, the system may also utilize one or more transformations between the lateral distance, longitudinal distance, relative velocity, and the safter metrics to normalize the lane change score. For instance, the system may determine multiple metrics for the lateral safety metric, the first or second longitudinal safety metrics or the like per lane change event or per object, such as based at various predated future positions along the lane change trajectory. The system may utilize the transformations to normalize the metrics and/or the lane change score over the series of metrics and/or scores associated with an object, a lane change trajectory, or the like. In some cases, the lane change score may be utilized by a simulation system to evaluate software updates prior to deployment with respect to ensuring safe lane change operations by the autonomous vehicle in various situations. In this example, the lane change score may be compared to one or more thresholds to determine if the software update is approved for deployment on operating vehicles.

FIG. 1 is an example block-diagram illustrating an example architecture of a simulation system 100 comprising a lane change score component 102, in accordance with implementations of the disclosure. As discussed above, a simulation system 100 may be used to test and/or evaluate software updates to systems and controls of autonomous vehicles prior to deployment. In this manner, the simulation system 100 may improve the overall safety and reliability of the autonomous vehicles during operation. In the current example, a scenario generation component 104 may receive log data from one or more vehicles on various roadways and/or other map data 106 representing physical environments. In some cases, the log or map data 106 may include sensor data, perception data, prediction data, trajectory information, and the like. The log or map data 106 may be processed by a scenario generation component 104, which may output one or more scenarios 108 based on the log or map data 106. For example, the scenario generation component 104 may be configured to parse log data 106 received from one or more vehicles to generate a plurality of scenarios 108 that may be used for simulated testing of software updates 110 associated with the vehicle prior to deployment of the software updates 110.

In some examples, the scenario generation component 104 may utilize parameters or states of objects to generate the simulation scenarios 108. In some examples, the scenario generation component 104 may then fit the scenarios 108 and/or arrange representative objects based on corresponding parameters (velocity, distance from the vehicle, associated region, direction of travel or trajectory, etc.) to the map data 106, such that the scenarios 108 are determined feasible at the selected map location or environment. In other examples, the scenario generation component 104 may generate the scenarios 108 synthetically. In some cases, the scenarios 108 may be fit to the map data 106, such that in some cases some scenarios 108 may be generated without relying on either the log data or the map data 106. In some examples, the scenarios 108 may be arranged as a set (e.g., multiple scenarios with different dynamic objects, conditions, and/or situations along a shared route, map, or physical environment) to test the autonomous vehicle's operations within a known route under varying parameters (such as multiple scenarios 108 with objects having perturbed positions, velocity, behavior, and the like).

In the simulation system 100, discussed herein, the simulation component 112 may receive the scenarios 108 and the software updates 110 being tested or evaluated. In some cases, the simulation component 112 may execute the simulations to determine result data 114 associated with the simulated vehicles performance within respect to each of the scenarios 108 and operating under the software update 110. The result data 114 may represent the outcome of each simulation instance associated with each scenario 108. For example, the result data 114 may be generated based at least in part on the simulation component 112 executing various simulations using varying or different parameter data associated with the dynamic objects along a similar or the same route. The simulation component 112 may output or otherwise generate result data 114 including the results of individual simulation instances as well as various flags related to the occurrence of particular events, such as an activation of one or more monitoring systems. The result data 114 may also include data representing the operations and events associated with the vehicle including any lane change events that may be analyzed by the lane change score component 102.

In some cases, the lane change score component 102 may generate, for each detected lane change event or operation in the result data 114, a lane change score 116 to evaluate the performance of the vehicle under the software update 110. As discussed herein, the lane change score 116 may be determined using one or more of a lateral safety metric, a first longitudinal safety metric, and a second longitudinal safety metric as well as other metrics, such as a cross traffic or junction metric. The lateral safety metric may represent a lateral time to contact between the autonomous vehicle and another object, such as a simulated dynamic object in the target lane. The first longitudinal safety metric may represent a longitudinal time to contact between the autonomous vehicle and another object, such as a simulated dynamic object in the current lane and/or target lane. The second longitudinal safety metric may represent a time gap or period of time in longitudinal direction between the vehicle departing a position or point of the physical environment until another object occupies the position or point or a period of time between another object departing a position or point of the physical environment until the vehicle occupies the position or point.

In some examples, the lane change score component 102 may determine or generate a lane change score each interval of a series of times associated with the lane change event as represented by the result data 114. For instance, the lane change score component 102 may determine the lane change score for a series of intervals associated with vehicle operations or systems (e.g., a planning system), associated with one or more sensors of the vehicle, a predetermined period of time (e.g., every half second, every second, every two seconds, or the like), or the like. In some cases, for each lane change event or operation, the system may select the lowest scoring lane change score of the series of lane change score as the lane change score representing the current lane change event. Likewise, the system may select the lowest scoring lane change score for each scenario 108 as the lane change score used to determine if the scenario 108 was passed or failed by the vehicle operating under the software updates 110. If any of the scenarios 108 were failed, the system 100 may utilize those scenarios 108 for generation of additional scenarios 108 that may be used in further simulated testing of the software updates 110. For instance, the failing scenario 108 may be evaluated to determine if additional scenarios 108 should be generated with respect to specific conditions causing, for instance, low or failing lane change scores 116 to assist with further evaluation of the software update 110.

In the current example, the lane change scores 116 may be provided back to, for instance, a development team for further debugging and/or modification. The modified software update may then be tested using the simulation component 112, the scenarios 108, and the like. In some cases, the lane change scores 116 may be compared with prior lane change scores on earlier versions of the software update 110 to determine if the software modifications improved the overall operations of the vehicle.

The lane change scores 116 may also be provided to an evaluation component 118 that may utilize at least in part on the lane change scores 116 to evaluate the software update 110. In some cases, the evaluation component 118 may determine if the software update 110 is deployed, undergoes further simulation and testing, or is returned to a developer for additional assessment based at least in part on the lane change scores 116. For instance, we may determine that a software update 110 may be released to operating vehicles when no lane change score 116 associated with any scenario 108 is above a threshold value.

In the current example, the lane change score component 102 and the evaluation component 118 are discussed with respect to evaluating software updates 110 prior to deployment via a simulation system 100. However, it should be understood, that in other examples, the system may be implemented on operating vehicles, such that the planning systems and/or perception systems together with sensor systems generate the lane change trajectory and object data associated with object proximate to the vehicle. In this example, the lane change score component 102 and the evaluation component 118 may utilize the sensor data and the lane change trajectory to determine the lane change score, as discussed herein, and determine if the lane change event is safe. If the lane change score is below one or more safety thresholds, the vehicle may abort the lane change operation or the vehicle may alert a remote operator to abort the lane change operation or manually drive or control the vehicle through the lane change event. Otherwise, if the lane change score meets or exceeds the thresholds, the autonomous vehicle may perform the lane change operation as planned.

Figure 2:
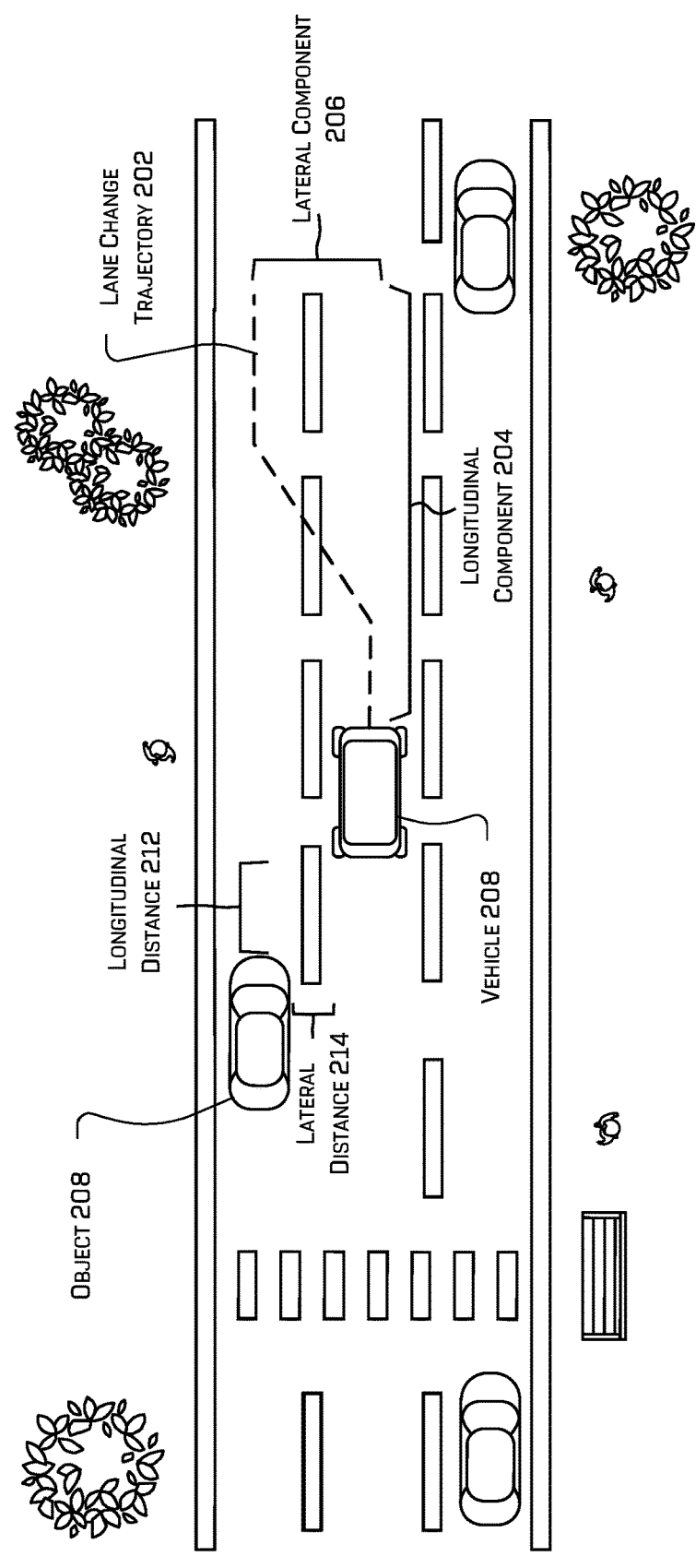
FIG. 2 is a pictorial diagram illustrating an example a lane change event, in accordance with implementations of the disclosure.

FIG. 2 is a pictorial diagram illustrating an example a lane change event 200, in accordance with implementations of the disclosure. In the current example, the simulation system or an operating vehicle may be evaluating a lane change trajectory 202. The lane change trajectory 202 may include a longitudinal component 204 and a lateral component 206. As discussed above, the longitudinal component 204 may be the length of the trajectory 202 in the longitudinal direction with respect to the axis of the vehicle 208 extending from a front bumper to a rear bumper and the lateral component 206 may be the length of the trajectory 202 in the lateral direction with respect to the axis.

When determining the various safety metrics including the lateral safety metric, the first longitudinal safety metric, and the second longitudinal safety metric the system may detect or otherwise identify an object, such as object 210. The object 210 may be in the target lane and/or the current lane, as discussed herein. In the current example, the object 208 is an automobile that is within the target lane and behind the vehicle 208 executing the lane change trajectory 202 in the longitudinal direction with respect to the axis of the vehicle 208. Once identified, the system may determine a longitudinal distance 212 and a lateral distance 214 between the vehicle 208 and the object 210. As discussed herein, the system may utilize the lateral distance 214 and a relative velocity between the object 210 and the vehicle 208 to determine the lateral safety metric. The system may also utilize the longitudinal distance 212 and the relative velocity between the object 210 and the vehicle 208 to determine the first longitudinal safety metric and the longitudinal distance 212 and a velocity of the object 210 (as the object 210 is behind the vehicle 208) to determine the second longitudinal safety metric.

FIGS. 3 through 7 are flow diagrams illustrating example processes associated with utilizing lance change scores to evaluate lane change operations associated with an autonomous vehicle as discussed herein. The processes are illustrated as a collection of blocks in a logical flow diagram, which represent a sequence of operations, some or all of which can be implemented in hardware, software, or a combination thereof. In the context of software, the blocks can represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 3 is a flow diagram illustrating an example process 300 associated with determining a lane change score associated with a lane change trajectory, in accordance with implementations of the disclosure. As discussed above, a system may be configured to evaluate performance of a software update via performance by a simulated autonomous vehicle with respect to one or more lane change scores and one or more thresholds or heuristics (such as safety thresholds, timing thresholds, and the like). Alternatively, a vehicle may be configured with a lane change evaluation component or system to determine if a planned lane change trajectory with respect to sensor data representative objects of the surrounding physical environment meets or exceeds the one or more safely thresholds or heuristics prior to performing the lane change operation or during a period of time at which the vehicle may abort the lane change operation.

At 302, the vehicle or system (e.g., simulation system) may detect a lane change event. For example, the system may determine that one or more criteria associated with indicating a lane change event are meet or exceeded (such as an obstruction in the current lane, a signal from a planner, a slow moving vehicle in the current lane, an upcoming transition to a turn lane on the planned route, or the like).

At 304, the system may determine a lateral safety metric associated with the lane change event. In some cases, the lateral safety metric may be determined based at least in part on a first period of time representing a time to contact with an object in the lateral direction from the vehicle based on a longitudinal axis of the vehicle extending from a front bumper to a rear bumper of the vehicle and one or more time-based thresholds or heuristics. For example, as discussed below with respect to process 300, the system may determine a lateral distance between the lateral object. The system may then determine a first period of time representing the time to contact based at least in part on the lateral distance and the lane change trajectory (e.g., such as a lateral component of a planned trajectory in the lateral direction). For instance, the system may step through the lane change trajectory at an interval (such as one second) and for each interval determine if the object contacts the vehicle based at least in part on the lateral distance. The system may then determine the first period of time based at least in part on the interval at which the contact was made and/or a number of intervals prior to the contact. The system may then compare the period of time to one or more thresholds or heuristics to determine the lateral safety metric or portion of the lane change score.

At 306, the system may determine a first longitudinal safety metric associated with the lane change event. In some cases, the first longitudinal safety metric may be determined based at least in part on a second period of time representing a time to contact with an object in the longitudinal direction from the vehicle based on the longitudinal axis and one or more time-based thresholds or heuristics. For example, as discussed below with respect to process 400, the system may determine a longitudinal distance between a longitudinal object (which may be the same or different than the lateral object of 304) and the vehicle and a relative velocity between the longitudinal object and the vehicle. The system may then determine a second period of time representing the time to contact with the longitudinal object based at least in part on the longitudinal distance, the relative velocity, and a longitudinal component of the lane change trajectory (e.g., the planned path in the longitudinal direction). The system may then compare the second period of time to one or more thresholds or heuristics to determine the first longitudinal safety metric or portion of the lane change score.

At 308, the system may determine a second longitudinal safety metric associated with the lane change event. In some cases, the second longitudinal safety metric may represent a third period of time representing a time gap between the longitudinal object departing a position on the lane change trajectory and the vehicle occupying the position or the vehicle departing the position on the lane change trajectory and the object occupying the position. For example, as discussed below with respect to process 500, the system may utilize the longitudinal distance between the vehicle and the longitudinal object (such as when the position on the lane change trajectory is a current position of the rear bumper of the vehicle or object, whichever is ahead). The system may also determine the velocity associated with the object when the object is behind the vehicle. The third period of time may then be determined based at least in part on the longitudinal distance and the velocity (e.g., either the velocity of the vehicle or the object, whichever is behind). The system may then compare the third period of time to one or more thresholds or heuristics to determine the second longitudinal safety metric or portion of the lane change score.

At 310, the system may determine if either the first second longitudinal safety metric or the second longitudinal safety metric are equal to or below a threshold. For example, in some implementations, the system may score the first second longitudinal safety metric and the second longitudinal safety metric between values of zero and one. In this case if the score is zero or less than or equal to a threshold for either the first second longitudinal safety metric or the second longitudinal safety metric, the lane change trajectory may be deemed unacceptable in the longitudinal direction and the process 300 may transition to 312. Otherwise, the process 300 may advance to 314.

At 312, the system may set either the first longitudinal safety metric or the second longitudinal safety metric to a zero for use in calculating the lane change score. For instance, in some cases, if either the time to contact represented by the second period of time or the time gap represented by the third period of time are less than a corresponding minimum safe threshold (for instance, less than two seconds), the lane change trajectory may be deemed unacceptable in longitudinal direction and both the first longitudinal safety metric and the second longitudinal safety metric may be set to zero or other value representing an unacceptable portion of the lane change trajectory.

At 314, the system may determine a combined longitudinal safety metric based at least in part on the first longitudinal safety metric and the second longitudinal safety metric. For example, the system may average the first longitudinal safety metric and the second longitudinal safety metric. Alternately, the system may multiply the first longitudinal safety metric with the second longitudinal safety metric to generate a combined metric. The system may then take the square root of the combined metric to generate the combined longitudinal safety metric.

At 316, the system may determine a lane change score associated with the lane change event based at least in part on the lateral safety metric and the combined longitudinal safety metric. For example, the system may select the larger or the maximum of the lateral safety metric and the combined longitudinal safety metric. In some cases, selecting the larger metric as the lane change score allows for improved performance of the autonomous vehicle when other objects are present in the vehicle's blind spot. In other cases, the system may select the smaller or the minimum of the lateral safety metric and the combined longitudinal safety metric, determine an average of the lateral safety metric and the combined longitudinal safety metric, or perform other calculations to combine the lateral safety metric with the combined longitudinal safety metric.

In some situations, such as multiple objects in the target lane, the system may generate a lane change score for each of the multiple objects in the manner discussed above with respect to process 300. In these situations, the system may select the lowest scoring lane change score as the lane change score of the lane change operation or event. In this manner, the lowest scoring lane change score may be used to determine the safety or permissibility of the lane change event prior to the vehicle executing the operation or with respect to evaluating a software update.

FIG. 4 is a flow diagram illustrating an example process 400 associated with determining a lateral safety metric associated with a lane change score, in accordance with implementations of the disclosure. As discussed above, a system may be configured to evaluate performance of a software update via performance by a simulated autonomous vehicle with respect to one or more lane change scores and one or more thresholds or heuristics. In some implementations, the lane change score may include a component or portion represented by the lateral safety metric discussed herein.

At 402, the system may determine a lateral component associated with a lane change trajectory. In some cases, the system may extract or determine the lateral component from the planned or executed lane change trajectory. For example, the system may determine the lateral component as a lateral length or distance associated with the lane change trajectory.

At 404, the system may determine a lateral distance between an object and a vehicle executing the lane change trajectory. For example, the system may select a nearest object, a nearest object in the lateral direction, a nearest object in the lateral direction and the direction of the lane change event, a nearest object in the lateral direction, the direction of the lane change event, and to the rear of the vehicle, a nearest object in the lateral direction, the direction of the lane change event, and ahead of the vehicle, or the like. In some cases, the object may be selected from the current lane, the target lane, or either the current lane or target lane. In some cases, the system may determine the lateral distance based at least in part on a distance of the object and/or the vehicle to a lane marker associated with a surface of a road. In some cases, the lateral distance may be the distance in the lateral direction with respect to the axis of the vehicle from the front bumper to the rear bumper in the direction of the target lane (e.g., objects in the lateral direction opposite the target lane may be ignore or not selected with respect to the lane change score).

At 406, the system may determine a period of time based at least in part on the lateral component and the lateral distance. For example, the period of time may represent a time to contact in the lateral direction between the vehicle and the object. In some examples, the system may move along the lane change trajectory at intervals (such as one second) until the object is predicted to contact the vehicle based at least in part on the lateral distance. The system may then utilize the interval of the predicted contact and/or the intervals prior to the predicted contact to determine the period of time.

At 408, the system may determine a lateral safety metric based at least in part on the period of time and one or more thresholds. For instance, the system may compare the period of time to one or more thresholds or heuristics. As an illustrative example, the lateral safety metric may be valued between zero and one, with zero representing unacceptable or impressible lane change operation. In this example, the system may increase the value of the lateral safety metric from zero to one. For instance, the system may deem the lane change trajectory impermissible in the lateral direction when the period of time is equal to or less than two seconds by applying a value of zero. Similarly, the system may deem the lane change trajectory safe in the lateral direction when the period of time is equal to or greater than three seconds by applying a value of one. The system may apply a value between zero and one when the period of time is between two and three seconds.

At 410, the system may determine a lane change score associated with the lane change trajectory based at least in part on the lateral safety metric and at least one longitudinal safety metric. For example, the system may select the larger or the maximum of the lateral safety metric and the longitudinal safety metric. In other cases, the system may select the smaller or the minimum of the lateral safety metric and the longitudinal safety metric, determine an average of the lateral safety metric and the longitudinal safety metric, or perform other calculations to combine the lateral safety metric with the longitudinal safety metric. In some cases, the lane change score may include multiple components each having to score above or equal to a threshold for the lane change trajectory to be deemed safe or equal to or below a threshold for the lane change trajectory to be deemed impermissible.

FIG. 5 is a flow diagram illustrating an example process 500 associated with determining a first longitudinal safety metric associated with a lane change score, in accordance with implementations of the disclosure. As discussed above, a system may be configured to evaluate performance of a software update via performance by a simulated autonomous vehicle with respect to one or more lane change scores and one or more thresholds or heuristics. In some implementations, the lane change score may include a component or portion represented by the first longitudinal safety metric discussed herein.

At 502, the system may determine a longitudinal component associated with a lane change trajectory. In some cases, the system may extract or determine the longitudinal component from the planned or executed lane change trajectory. For example, the system may determine the longitudinal component as a longitudinal length or distance associated with the lane change trajectory.

At 504, the system may determine a longitudinal distance between an object and a vehicle executing the lane change trajectory. For example, the system may select a nearest object, a nearest object in the longitudinal direction, a nearest object in the longitudinal direction and the direction of the lane change event, a nearest object in the longitudinal direction, the direction of the lane change event, and to the rear of the vehicle, a nearest object in the longitudinal direction, the direction of the lane change event, and ahead of the vehicle, or the like. In some cases, the object may be selected from the current lane, the target lane, or either the current lane or target lane.

At 506, the system may determine a relative velocity between the object and the vehicle. For example, the system may utilize sensor data captured by the vehicle (either in the simulation or during operations) to determine the relative velocity. In some cases, the velocity may be predicted or averaged over a period of time associated with the lane change event.

At 508, the system may determine a period of time based at least in part on the longitudinal component, the longitudinal distance, and the relative velocity. For example, the period of time may represent a time to contact in the longitudinal direction between the vehicle and the object.

At 510, the system may determine a first longitudinal safety metric based at least in part on the period of time and one or more thresholds. For instance, the system may compare the period of time to one or more thresholds or heuristics. As an illustrative example, the first longitudinal safety metric may be valued between zero and one, with zero representing an impermissible lane change operation. In this example, the system may increase the value of the first longitudinal safety metric from zero to one. For instance, the system may deem the lane change trajectory impermissible in the longitudinal direction when the period of time is equal to or less than two seconds by applying a value of zero. Similarly, the system may deem the lane change trajectory safe in the longitudinal direction when the period of time is equal to or greater than three seconds by applying a value of one. The system may apply a value between zero and one when the period of time is between two and three seconds.

At 512, the system may determine a lane change score associated with the lane change trajectory based at least in part on the first longitudinal safety metric and at least one safety metric (such as a lateral safety metric). For example, the system may select the larger or the maximum of the lateral safety metric and the first longitudinal safety metric. In other cases, the system may select the smaller or the minimum of the lateral safety metric and the first longitudinal safety metric, determine an average of the lateral safety metric and the first longitudinal safety metric, or perform other calculations to combine the lateral safety metric with the first longitudinal safety metric. In some cases, the lane change score may include multiple components each having to score above or equal to a threshold for the lane change trajectory to be deemed safe or equal to or below a threshold for the lane change trajectory to be deemed impressible.

FIG. 6 is a flow diagram illustrating an example process 600 associated with determining a second longitudinal safety metric associated with a lane change score, in accordance with implementations of the disclosure. As discussed above, a system may be configured to evaluate performance of a software update via performance by a simulated autonomous vehicle with respect to one or more lane change scores and one or more thresholds or heuristics. In some implementations, the lane change score may include a component or portion represented by the first longitudinal safety metric discussed herein.

At 602, the system may determine a longitudinal distance between an object and a vehicle executing the lane change trajectory. For example, the system may select a nearest object, a nearest object in the longitudinal direction, a nearest object in the longitudinal direction and the direction of the lane change event, a nearest object in the longitudinal direction, the direction of the lane change event, and to the rear of the vehicle, a nearest object in the longitudinal direction, the direction of the lane change event, and ahead of the vehicle, or the like. In some cases, the object may be selected from the current lane, the target lane, or either the current lane or target lane. In some cases, when the lane change score includes the first longitudinal safety metric and the second longitudinal safety metric, the system may utilize the same longitudinal distance and object for both process 500 and 600.

At 604, the system may determine a velocity of the object. For example, the system may utilize sensor data captured by the vehicle (either in the simulation or during operations) to determine the velocity. In some cases, the velocity may be predicted or averaged over a period of time associated with the lane change event. Alternately, the velocity may be the velocity of the vehicle which may be known from other vehicle systems.

At 606, the system may determine a period of time based at least in part on the longitudinal distance and the velocity. For example, the period of time may represent a time gap in the longitudinal direction between the vehicle and the object passing a position in the physical environment.

At 608, the system may determine a second longitudinal safety metric lane based at least in part on the period of time and one or more thresholds. For instance, the system may compare the period of time to one or more thresholds or heuristics. As an illustrative example, the second longitudinal safety metric may be valued between zero and one, with zero representing an impermissible lane change operation. In this example, the system may increase the value of the second longitudinal safety metric from zero to one. For instance, the system may deem the lane change trajectory impermissible in the longitudinal direction when the period of time is equal to or less than 0.8 seconds by applying a value of zero. Similarly, the system may deem the lane change trajectory safe in the longitudinal direction when the period of time is equal to or greater than two seconds by applying a value of one. The system may apply a value between zero and one when the period of time is between 0.8 and two seconds.

At 610, the system may determine a lane change score associated with the lane change trajectory based at least in part on the second longitudinal safety metric and at least one safety metric (such as a lateral safety metric). For example, the system may select the larger or the maximum of the lateral safety metric and the second longitudinal safety metric. In other cases, the system may select the smaller or the minimum of the lateral safety metric and the second longitudinal safety metric, determine an average of the lateral safety metric and the second longitudinal safety metric, or perform other calculations to combine the lateral safety metric with the second longitudinal safety metric. In some cases, the lane change score may include multiple components each having to score above or equal to a threshold for the lane change trajectory to be deemed safe or equal to or below a threshold for the lane change trajectory to be deemed impermissible.

In some cases, the system may also combine the second longitudinal safety metric with another longitudinal safety metric (such as the first longitudinal safety metric of process 500). For example, the system may combine the first and second longitudinal safety metrics by averaging the first longitudinal safety metric and the second longitudinal safety metric. Alternately, the system may multiple the first longitudinal safety metric with the second longitudinal safety metric to generate a combined metric. The system may then take the square root of the combined metric to generate a combined longitudinal safety metric, as discussed herein.

FIG. 7 is another flow diagram illustrating an example process 700 associated with determining a second longitudinal safety metric associated with a lane change score, in accordance with implementations of the disclosure. As discussed above, a system may be configured to evaluate performance of a software update via performance by a simulated autonomous vehicle with respect to one or more lane change scores and one or more thresholds or heuristics. In some implementations, the lane change score may include a component or portion represented by the first longitudinal safety metric discussed herein.

At 702, the system may determine a position associated with a lane change trajectory. For example, the system may select a position associated with the vehicle (e.g., a rear bumper position) or a position associated with an object (such as an automobile ahead of the autonomous vehicle). For example, the position may be in the environment (e.g., physical or simulated) but selected based on a current position of the vehicle or the object (such as whichever is ahead of the other).

At 704, the system may determine a time gap associated with a period of time between an object and an autonomous vehicle occupying the position. For instance, the time gap may be between the vehicle departing the position in the environment and the object occupying the position or, vice versa, the object departing the position in the environment and the vehicle occupying the position. In these case, the system may determine a velocity of the object or vehicle, whichever is in the rear of or behind the other.

At 706, the system may determine a second longitudinal safety metric lane based at least in part on the time gap and one or more thresholds. For instance, the system may compare the period of time of the time gap to one or more thresholds or heuristics. As an illustrative example, the second longitudinal safety metric may be valued between zero and one, with zero representing an impermissible lane change operation. In this example, the system may increase the value of the second longitudinal safety metric from zero to one. For instance, the system may deem the lane change trajectory impermissible in the longitudinal direction when the time gap is equal to or less than 0.8 seconds by applying a value of zero. Similarly, the system may deem the lane change trajectory safe in the longitudinal direction when the time gap is equal to or greater than two seconds by applying a value of one. The system may apply a value between zero and one when the period of time is between 0.8 and two seconds.

At 708, the system may determine a lane change score associated with the lane change trajectory based at least in part on the second longitudinal safety metric and at least one safety metric (such as a lateral safety metric). For example, the system may select the larger or the maximum of the lateral safety metric and the second longitudinal safety metric. In other cases, the system may select the smaller or the minimum of the lateral safety metric and the second longitudinal safety metric, determine an average of the lateral safety metric and the second longitudinal safety metric, or perform other calculations to combine the lateral safety metric with the second longitudinal safety metric. In some cases, the lane change score may include multiple components each having to score above or equal to a threshold for the lane change trajectory to be deemed safe or equal to or below a threshold for the lane change trajectory to be deemed impermissible.

In some cases, the system may also combine the second longitudinal safety metric with another longitudinal safety metric (such as the first longitudinal safety metric of process 400). For example, the system may combine the first and second longitudinal safety metrics by averaging the first longitudinal safety metric and the second longitudinal safety metric. Alternately, the system may multiple the first longitudinal safety metric with the second longitudinal safety metric to generate a combined metric. The system may then take the square root of the combined metric to generate a combined longitudinal safety metric, as discussed herein.

In the above process 300-700, the system may select an object. It should be understood that in some implementations, the system may select a single object for each of the metrics. However, the system may also select different objects for each of the metrics. In some cases, the system may select one object for the lateral safety metrics and one object for the longitudinal safety metrics.

In the above processes 300-700, the lane change score, the lateral safety metric, the first longitudinal safety metric, and the second longitudinal safety metric are determined based on one interval. However, it should be understood, that the system or vehicle may generate a lane change score for a specific lane change trajectory or event at multiple intervals and utilize the series of lane change scores to determine if the lane change operation is safe and/or should be aborted.

Figure 8:
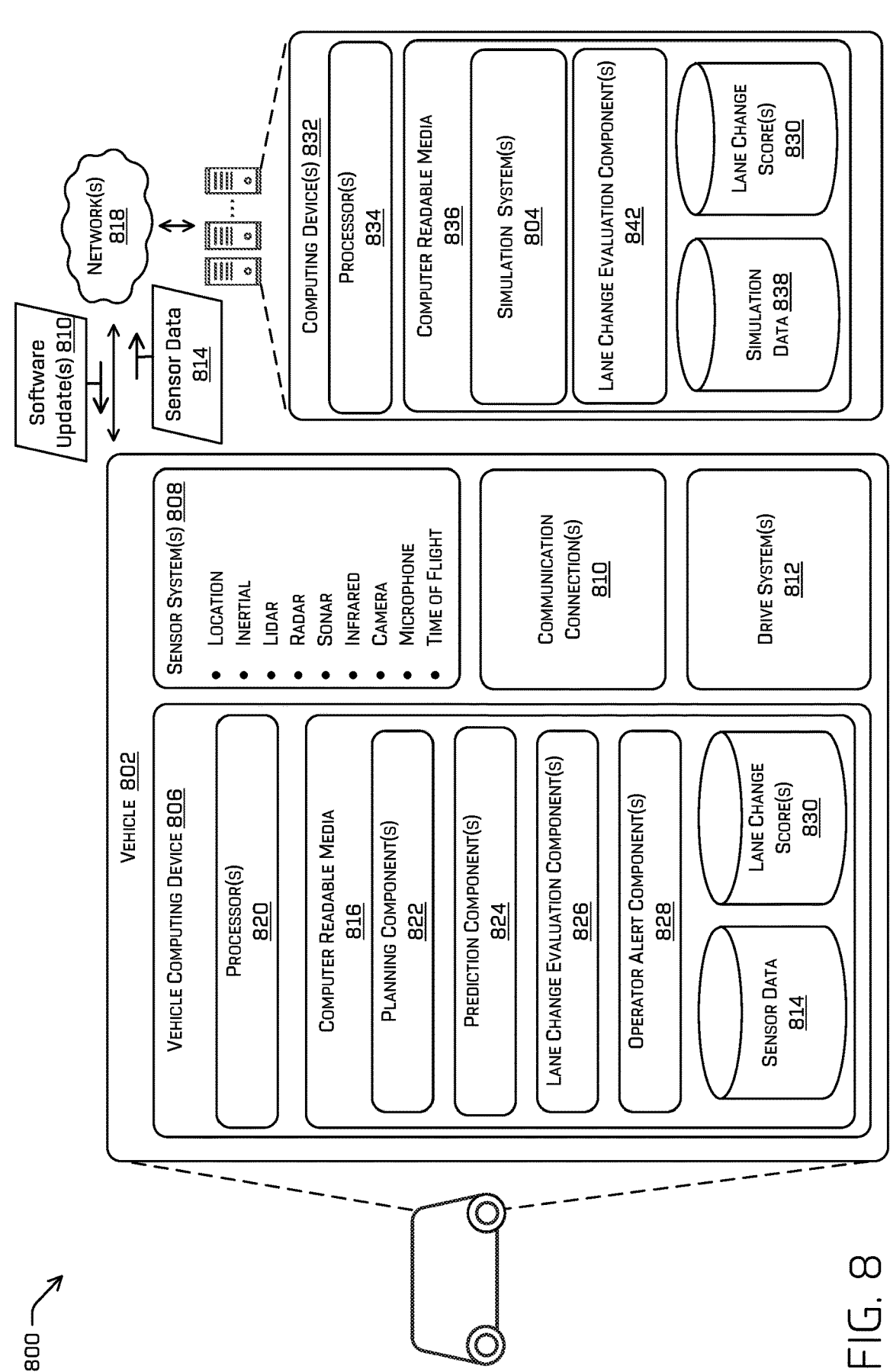
FIG. 8 is a pictorial diagram illustrating an example of an autonomous vehicle and simulation system for evaluating lane change events associated with operations an autonomous vehicle.

FIG. 8 is a pictorial diagram illustrating an example 800 of an autonomous vehicle 802 and one or more simulation systems 804 for evaluating lane change events associated with operations an autonomous vehicle. The vehicle 802 may include computing device(s) 806, one or more sensor system(s) 808, one or more communication connection(s) 810 (also referred to as communication devices and/or modems), and one or more drive system(s) 812. The one or more sensor system(s) 808 may be configured to capture the sensor data 814 associated with a surrounding physical environment that may be used for evaluating lane change trajectories, events, and for use in generating simulations by the simulation system(s) 804, as discussed herein.

In at least some examples, the sensor system(s) 808 may include thermal sensors, time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 808 may include multiple instances of each type of sensors. For instance, time-of-flight sensors may include individual time-of-flight sensors located at the corners, front, back, sides, and/or top of the vehicle 802. As another example, camera sensors may include multiple cameras disposed at various locations about the exterior and/or interior of the vehicle 802. In some cases, the sensor system(s) 808 may provide input to the computing device(s) 806.

The vehicle 802 can also include one or more communication connection(s) 810 that enables communication between the vehicle 802 and one or more other local or remote computing device(s) (e.g., a remote teleoperations computing device) or remote services, such as a remote operator of the vehicle that may perform a human controlled lane change event or abort the lane change event based on the lane change score, as discussed above. For instance, the communication connection(s) 810 may facilitate communication with other local computing device(s) on the vehicle 802 and/or the drive system(s) 812. Also, the communication connection(s) 810 may allow the vehicle 802 to communicate with other nearby computing device(s) (e.g., other nearby vehicles, traffic signals, etc.).

The communications connection(s) 810 may include physical and/or logical interfaces for connecting the computing device(s) 806 to another computing device or one or more external network(s) 818 (e.g., the Internet). For example, the communications connection(s) 810 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 810 may comprise the one or more modems as described in detail above.

In at least one example, the vehicle 802 may include one or more drive system(s) 812. In some examples, the vehicle 802 may have a single drive system 812. In at least one example, if the vehicle 802 has multiple drive systems 812, individual drive systems 812 may be positioned on opposite ends of the vehicle 802 (e.g., the front and the rear, etc.). In at least one example, the drive system(s) 812 can include one or more sensor system(s) 808 to detect conditions of the drive system(s) 812 and/or the surroundings of the vehicle 802. By way of example and not limitation, the sensor system(s) 808 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 812. In some cases, the sensor system(s) 808 on the drive system(s) 812 can overlap or supplement corresponding systems of the vehicle 802 (e.g., sensor system(s) 808).

The drive system(s) 812 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 812 can include a drive system controller which may receive and preprocess data from the sensor system(s) 808 and to control operation of the various vehicle systems. In some examples, the drive system controller can include one or more processor(s) and memory communicatively coupled with the one or more processor(s). The computer readable media 816 can store one or more modules to perform various functionalities of the drive system(s) 812. Furthermore, the drive system(s) 812 may also include one or more communication connection(s) that enables communication by the respective drive system with one or more other local or remote computing device(s).

The computing device(s) 806 may include one or more processors 820 and one or more computer readable media 816 communicatively coupled with the processor(s) 820. In the illustrated example, the computer readable media 816 of the computing device(s) 806 stores planning system(s) 822 or component(s) thereof, prediction system(s) 824 or component(s), lane change evaluation component(s) 826 or related systems, as well as one or more other system(s) or component(s) 828. The computer readable media 816 may also store data such as sensor data 814 captured or collected by the one or more sensors systems 808 and lane change scores 830 generated by the lane change evaluation components 826.

The planning system 822 may be configured to determine a route for the vehicle 802 to follow to traverse through an environment. For example, the planning system 822 may determine various routes and paths and various levels of detail based at least in part on the identified objects, the predicted behaviors, states and/or characteristics of the object at future times, the confidence value associated with each predicted behavior or state, and a set of safety requirements corresponding to the current scenario (e.g., combination of objects detected and/or environmental conditions). In some instances, the planning system 822 may determine a route to travel from a first location (e.g., a current location) to a second location (e.g., a target location) in order to avoid an object obstructing or blocking a planned path of the vehicle 802. In some case, a route can be a sequence of waypoints for traveling between the two locations (e.g., the first location and the second location). In some cases, waypoints include streets, intersections, global positioning system coordinates, and the like. The prediction system 824 may be configured to generate object data, such as detecting nearby objects, predicting velocities and other behaviors and the like, as discussed above.

The lane change evaluation components 826 may be configured to generate lane change scores 830 and to determine if a lane change event or operation should be aborted or may be performed. In some cases, the lane change evaluation components 826 may determine if one or more remote operators should take control of the vehicle for manual driving or human controlled driving during the lane change event based at least in part on the lane change scores 830 associated with a particular lane change trajectory.

In at least one example, the computing device(s) 806 may store one or more system controllers, which may be configured to control steering, propulsion, braking, safety, emitters, communication, and other systems of the vehicle 802. The system controllers may communicate with and/or control corresponding systems of the drive system(s) 812 and/or other components of the vehicle 802, which may be configured to operate in accordance with a route provided from the planning system 822.

In some implementations, the vehicle 802 may connect to computing device(s) 832 via the network(s) 818. The computing device 832 may include one or more processors 834 and computer readable media 836 (e.g., memory) communicatively coupled with the one or more processors 834. In at least one instance, the processor(s) 834 may be similar to the processor(s) 820 and the computer readable media 836 may be similar to the computer readable media 816. In the illustrated example, the computer readable media 836 of the computing device(s) 832 stores the simulation data 838 and the lane change scores 830. The computer readable media 836 may also store the simulation system(s) 804 or components thereof and lane change evaluation system(s) or component(s) 842 or related system, as well as other systems, such as an operating system.

The processor(s) 820 of the computing device(s) 806 and the processor(s) 834 of the computing device(s) 832 may be any suitable processor capable of executing instructions to process data and perform operations as described herein. By way of example and not limitation, the processor(s) 820 and 834 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The computer readable media 816 of the computing device(s) 806 and the computer readable media 836 of the computing device(s) 832 are examples of non-transitory computer-readable media. The computer readable media 816 and the computer readable media 836 can store an operating system and one or more software applications, instructions, programs, and/or data to implement the methods described herein and the functions attributed to the various systems. In various examples, the computer readable media 816 and the computer readable media 836 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the computer readable media 816 and/or the computer readable media 836 can be implemented as a neural network.

Figure 9:
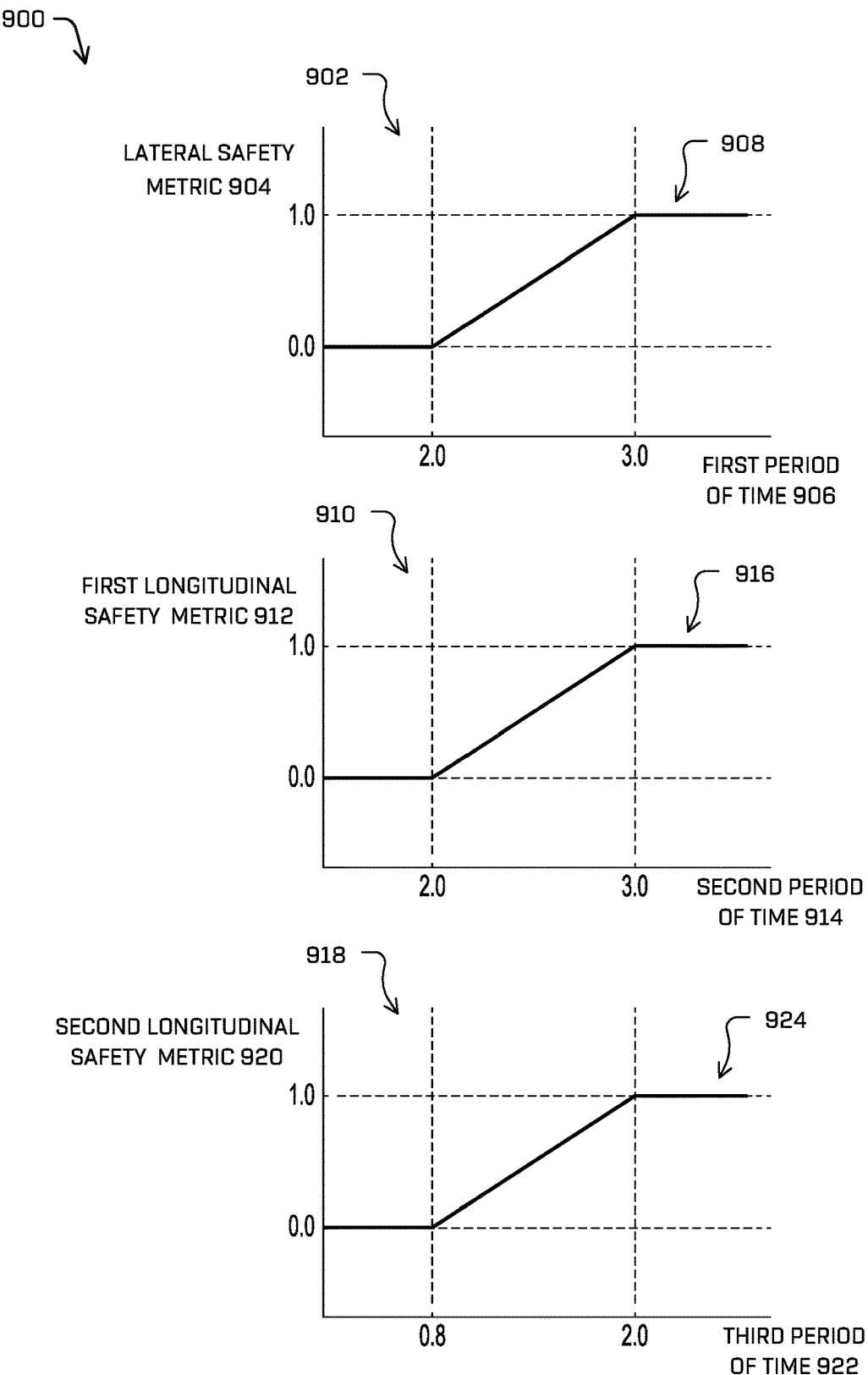
FIG. 9 is a pictorial diagram illustrating example periods of time to safety metric values, in accordance with implementations of the disclosure.

FIG. 9 is a pictorial diagram 900 illustrating example periods of time to safety metric values, in accordance with implementations of the disclosure. In the current example, potential values of a lateral safety metric are illustrated with respect to graph 902. The graph 902 may illustrate lateral safety metric values 904 along the vertical axis and a period of time 906 (such as the first period of time) along the horizontal axis. In this example, the lateral safety metric values 904 may vary between zero and one along the line 908 based on the first period of time 906 associated with each lane change operation or event. For instance, if the period of time 906 is equal to or less than two second, the system may set the value of the lateral safety metric to zero. However, if the period of time 906 is greater than or equal to three seconds, the system may set the value of the lateral safety metric to one or safe. The system may then when the period of time 906 is between two and three seconds, set the value of the lateral safety metric to a value between zero and one as shown.

The current example also includes potential values of a first longitudinal safety metric are illustrated with respect to graph 910. The graph 910 may illustrate first longitudinal safety metric values 912 along the vertical axis and a period of time 914 (such as the second period of time) along the horizontal axis. In this example, the first longitudinal safety metric values 812 may vary between zero and one along the line 916 based on the period of time 914 associated with each lane change operation or event. For instance, if the period of time 914 is equal to or less than two second, the system may set the value of the first longitudinal safety metric to zero. However, if the period of time 914 is greater than or equal to three seconds, the system may set the value of the first longitudinal safety metric to one or safe. The system may then when the period of time 914 is between two and three seconds, set the value of the first longitudinal safety metric to a value between zero and one as shown.

The current example also includes potential values of a second longitudinal safety metric are illustrated with respect to graph 918. The graph 918 may illustrate second longitudinal safety metric values 920 along the vertical axis and a period of time 922 (such as the third period of time) along the horizontal axis. In this example, the second longitudinal safety metric values 812 may vary between zero and one along the line 924 based on the period of time 922 associated with each lane change operation or event. For instance, if the period of time 922 is equal to or less than two 0.8 second, the system may set the value of the second longitudinal safety metric to zero. However, if the period of time 922 is greater than or equal to two seconds, the system may set the value of the second longitudinal safety metric to one or safe. The system may then when the period of time 922 is between 0.8 and two seconds, set the value of the second longitudinal safety metric to a value between zero and one as shown.

It should be understood, that the values 904, 912, and 920 as well as the period of times 906, 914, and 922 are for illustration purposes and that other values and/or period of times may be used to determine the safety metrics. It should also be understood that while the current lines 908, 916, and 924 illustrate a linear change in score that other types of changes in scores may be used, such as exponential, increasing or decreasing trajectories, various transform representations, or the like Example Clauses A. A system comprising: one or more processors; and one or more non-transitory computer-readable media storing computer-executable instructions that, when executed, cause the one or more processors to perform operations comprising: determining that a vehicle is traveling in a first lane in a simulation; determining a first trajectory associated with the vehicle navigating into a second lane; receiving simulation data representing a position of a simulated object associated with the second lane; determining a relative velocity between the vehicle and the simulated object; determining, based at least in part on a lateral distance between the simulated object and the vehicle, a first period of time; determining, based at least in part on a longitudinal distance between the vehicle and the simulated object and the relative velocity, a second period of time; determining a second velocity, the second velocity associated with at least one of the simulated object or the vehicle; determining, based at least in part on the longitudinal distance between the vehicle and the simulated object and the second velocity, a third period of time; determining, based at least in part on the first period of time, the second period of time, and the third period of time, a score associated with the first trajectory; and outputting, based at least in part on the score, an indication of whether the first trajectory is a safe trajectory for controlling the vehicle.

B. The system of A, further comprising: determining, based at least in part on the score, at least one of: (i) a portion of operating software of the vehicle to be updated to improve the score, or (ii) the vehicle to be controlled based on a second trajectory different than the first trajectory.

C. The system of A, wherein the first period of time is determined based at least in part on two or more future position along the first trajectory and the lateral distance.

D. The system of A, wherein the simulated object is determined to be associated with the second lane based at least in part on determining that the simulated object is predicted to navigate to the second lane within a threshold time of the vehicle following the first trajectory into the second lane.

E. The system of A, wherein the score is a first score, the simulated object is a first simulated object, and the operations further comprises: receiving simulation data representing a position of a second simulated object associated with the second lane; determining a second relative velocity between the vehicle and the second simulated object; determining, based at least in part on a lateral distance between the second simulated object and the vehicle, a third period of time; determining, based at least in part on a longitudinal distance between the vehicle and the second simulated object and the second relative velocity, a fourth period of time; determining a third velocity, the third velocity associated with at least one of the second simulated object or the vehicle; determining, based at least in part on the longitudinal distance between the vehicle and the second simulated object and the third velocity, a fifth period of time; determining, based at least in part on the third period of time, the fourth period of time, and the fifth period of time, a second score associated with the first trajectory; selecting the first score to output based at least in part on the first score being less than or equal to the second score.

F. One or more non-transitory computer-readable media storing instructions executable by one or more processors, wherein the instructions, when executed, cause the one or more processors to perform operations comprising: receiving a first trajectory associated with a vehicle navigating from a first lane to a second lane; determining a first period of time associated with a lateral distance between the vehicle and an object proximate to the vehicle; determining a second period of time associated with a longitudinal distance between the vehicle and the object and a relative velocity between the object and the vehicle; determining a third period of time associated with the longitudinal distance between the object and the vehicle and second velocity, the second velocity associated with at least one of the simulated object or the vehicle; and outputting the first period of time, the second period of time, and the third period of time.

G. The one or more non-transitory computer-readable media of F, wherein: determining the second period of time is based at least in part on a longitudinal portion of the first trajectory; and determining the third period of time is based at least in part on a longitudinal portion of the first trajectory.

H. The one or more non-transitory computer-readable media of F, wherein the lateral distance is determined based at least in part on: identifying a side of the object that is closest to the vehicle.

I. The one or more non-transitory computer-readable media of F, further comprising determining the object is located within the second lane.

J. The one or more non-transitory computer-readable media of F, further comprising determining whether to execute the first trajectory based at least in part on the first period of time, the second period of time, and the third period of time.

K. The one or more non-transitory computer-readable media of F, further comprising determining whether to deploy a software update based at least in part on the first period of time, the second period of time, and the third period of time.

L. The one or more non-transitory computer-readable media of F, wherein determining the score is based at least in part on: determining a classification of the object; and determining, based at least in part on the classification of the object, a modified score.

M. The one or more non-transitory computer-readable media of F, wherein the longitudinal distance is measured from at least one of: a first front bumper of the vehicle and a first rear bumper of the object, or a second rear bumper of the vehicle and a second front bumper of the object.

N. The one or more non-transitory computer-readable media of F, wherein the operations further comprise: determining, based at least in part on the first period of time being within a first range of times, a first value associated with the first period of time; determining, based at least in part on the second period of time being within a second range of times, a second value associated with the second period of time; determining, based at least in part on the third period of time being within a third range of times, a third value associated with the third period of time; and determining, based at least in part on the first value, the second value, and the third value, an overall value representing the score; and determining whether to execute the first trajectory based at least in part on the score.

O. A method comprising: receiving a first trajectory associated with a vehicle navigating from a first lane to a second lane; determining a first period of time associated with a lateral distance between the vehicle and an object proximate to the vehicle; determining a second period of time associated with a longitudinal distance between the vehicle and the object and a relative velocity between the object and the vehicle; determining a third period of time associated with the longitudinal distance between the object and the vehicle and a second velocity, the second velocity associated with at least one of the simulated object or the vehicle; and determining whether to execute the first trajectory based at least in part on the first period of time, the second period of time, and the third period of time.

P. The method of O, wherein: determining the second period of time is based at least in part on a lateral portion of the first trajectory; and determining the third period of time is based at least in part on a longitudinal portion of the first trajectory.

Q. The method of O, further comprising determining the object is associated with the second lane based at least in part on at least one of: determining that the object is located within the second lane, or determining that the object is predicted to navigate to the second lane within a threshold time of the vehicle following the first trajectory into the second lane.

R. The method of O, wherein the longitudinal distance is measured from at least one of: a first front bumper of the vehicle and a first rear bumper of the object, or a second rear bumper of the vehicle and a second front bumper of the object.

S. The method of O, further comprising: determining, based at least in part on the first period of time, the second period of time, and the third period of time, a score associated with the first trajectory; and wherein determining whether to execute the first trajectory is based at least in part on the score.

T. The method of S, wherein determining the score comprises: determining, based at least in part on the first period of time being within a first range of times, a first value associated with the first period of time; determining, based at least in part on the second period of time being within a second range of times, a second value associated with the second period of time; determining, based at least in part on the third period of time being within a third range of times, a third value associated with the third period of time; and determining, based at least in part on the first value, the second value, and the third value, an overall value representing the score.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 8, such as the lane change evaluation components 826 and 842 may utilize the processes and flows of FIGS. 2 through 6.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing computer-executable instructions that, when executed, cause the one or more processors to perform operations comprising:

determining that a vehicle is traveling in a first lane in a simulation;

determining a first trajectory associated with the vehicle navigating into a second lane;

receiving simulation data representing a position of a simulated object associated with the second lane;

determining a relative velocity between the vehicle and the simulated object;

determining, based at least in part on a lateral distance between the simulated object and the vehicle, a first period of time;

determining, based at least in part on a longitudinal distance between the vehicle and the simulated object and the relative velocity, a second period of time;

determining a second velocity, the second velocity associated with at least one of the simulated object or the vehicle;

determining, based at least in part on the longitudinal distance between the vehicle and the simulated object and the second velocity, a third period of time;

determining, based at least in part on the first period of time, the second period of time, and the third period of time, a score associated with the first trajectory;

outputting, based at least in part on the score, an indication of whether the first trajectory is a safe trajectory for controlling the vehicle; and controlling, based at least in part on the indication, the vehicle to follow a second trajectory that is different than the first trajectory.

2. The system of claim 1, further comprising:

determining, based at least in part on the score, a portion of operating software of the vehicle to be updated to improve the score.

3. The system of claim 1, wherein the first period of time is determined based at least in part on two or more future position along the first trajectory and the lateral distance.

4. The system of claim 1, wherein the simulated object is determined to be associated with the second lane based at least in part on determining that the simulated object is predicted to navigate to the second lane within a threshold time of the vehicle following the first trajectory into the second lane.

5. The system of claim 1, wherein the score is a first score, the simulated object is a first simulated object, and the operations further comprises:

receiving simulation data representing a position of a second simulated object associated with the second lane;

determining a second relative velocity between the vehicle and the second simulated object;

determining, based at least in part on a lateral distance between the second simulated object and the vehicle, a third period of time;

determining, based at least in part on a longitudinal distance between the vehicle and the second simulated object and the second relative velocity, a fourth period of time;

determining a third velocity, the third velocity associated with at least one of the second simulated object or the vehicle;

determining, based at least in part on the longitudinal distance between the vehicle and the second simulated object and the third velocity, a fifth period of time;

determining, based at least in part on the third period of time, the fourth period of time, and the fifth period of time, a second score associated with the first trajectory;

selecting the first score to output based at least in part on the first score being less than or equal to the second score.

6. One or more non-transitory computer-readable media storing instructions executable by one or more processors, wherein the instructions, when executed, cause the one or more processors to perform operations comprising:

receiving a first trajectory associated with a vehicle navigating from a first lane to a second lane;

determining a first period of time associated with a lateral distance between the vehicle and an object proximate to the vehicle;

determining a second period of time associated with a longitudinal distance between the vehicle and the object and a relative velocity between the object and the vehicle;

determining a third period of time associated with the longitudinal distance between the object and the vehicle and second velocity, the second velocity associated with at least one of the object or the vehicle;

determining, based at least in part on the first period of time, the second period of time, and the third period of time, a score associated with a first trajectory;

outputting, based at least in part on the score, an indication of whether the first trajectory is a safe trajectory for controlling the vehicle; and controlling, based at least in part on the indication, the vehicle to follow a second trajectory that is different than the first trajectory.

7. The one or more non-transitory computer-readable media of claim 6, wherein:

determining the second period of time is based at least in part on a longitudinal portion of the first trajectory; and determining the third period of time is based at least in part on a longitudinal portion of the first trajectory.

8. The one or more non-transitory computer-readable media of claim 6, wherein the lateral distance is determined based at least in part on:

identifying a side of the object that is closest to the vehicle.

9. The one or more non-transitory computer-readable media of claim 6, further comprising determining the object is located within the second lane.

10. The one or more non-transitory computer-readable media of claim 6, further comprising determining whether to execute the first trajectory based at least in part on the first period of time, the second period of time, and the third period of time.

11. The one or more non-transitory computer-readable media of claim 6, further comprising determining whether to deploy a software update based at least in part on the first period of time, the second period of time, and the third period of time.

12. The one or more non-transitory computer-readable media of claim 6, wherein determining the score is based at least in part on:

determining a classification of the object; and determining, based at least in part on the classification of the object, a modified score.

13. The one or more non-transitory computer-readable media of claim 6, wherein the longitudinal distance is measured from at least one of:

a first front bumper of the vehicle and a first rear bumper of the object, or a second rear bumper of the vehicle and a second front bumper of the object.

14. The one or more non-transitory computer-readable media of claim 6, wherein the operations further comprise:

determining, based at least in part on the first period of time being within a first range of times, a first value associated with the first period of time;

determining, based at least in part on the second period of time being within a second range of times, a second value associated with the second period of time;

determining, based at least in part on the third period of time being within a third range of times, a third value associated with the third period of time; and determining, based at least in part on the first value, the second value, and the third value, an overall value representing the score; and determining whether to execute the first trajectory based at least in part on the score.

15. A method comprising:

receiving a first trajectory associated with a vehicle navigating from a first lane to a second lane;

determining a first period of time associated with a lateral distance between the vehicle and an object proximate to the vehicle;

determining a second period of time associated with a longitudinal distance between the vehicle and the object and a relative velocity between the object and the vehicle;

determining a third period of time associated with the longitudinal distance between the object and the vehicle and a second velocity, the second velocity associated with at least one of the object or the vehicle;

determining, based at least in part on the first period of time, the second period of time, and the third period of time, a score associated with the first trajectory; and controlling, based at least in part on the score, the vehicle to follow a second trajectory that is different than the first trajectory.

16. The method of claim 15, wherein:

determining the second period of time is based at least in part on a lateral portion of the first trajectory; and determining the third period of time is based at least in part on a longitudinal portion of the first trajectory.

17. The method of claim 15, further comprising determining the object is associated with the second lane based at least in part on at least one of:

determining that the object is located within the second lane, or determining that the object is predicted to navigate to the second lane within a threshold time of the vehicle following the first trajectory into the second lane.

18. The method of claim 15, wherein the longitudinal distance is measured from at least one of:

a first front bumper of the vehicle and a first rear bumper of the object, or a second rear bumper of the vehicle and a second front bumper of the object.

19. The method of claim 15, wherein determining the score comprises:

determining, based at least in part on the first period of time being within a first range of times, a first value associated with the first period of time;

determining, based at least in part on the second period of time being within a second range of times, a second value associated with the second period of time;

determining, based at least in part on the third period of time being within a third range of times, a third value associated with the third period of time; and determining, based at least in part on the first value, the second value, and the third value, an overall value representing the score.

20. The system of claim 1, wherein the longitudinal distance is measured from at least one of:

a first front bumper of the vehicle and a first rear bumper of the simulated object, or a second rear bumper of the vehicle and a second front bumper of the simulated object.

* * * * *